(12) United States Patent
Dattilo et al.

(10) Patent No.: US 7,881,841 B2
(45) Date of Patent: Feb. 1, 2011

(54) MOTION-CONTROL SYSTEM

(75) Inventors: James Donald Dattilo, Metamora, IL (US); Shawn I. Cullen, Peoria, IL (US); Norval Paul Thomson, Dunlap, IL (US); Kenneth K. Her, Peoria, IL (US); Marc Daniel Proud, Glasford, IL (US); Arvil Duane Wilson, Pekin, IL (US); Wendell Dean Stahl, Bradford, IL (US)

(73) Assignee: Caterpillar Inc., Peoria, IL (US)

( * ) Notice: Subject to any disclaimer, the term of this patent is extended or adjusted under 35 U.S.C. 154(b) by 1069 days.

(21) Appl. No.: 11/646,534

(22) Filed: Dec. 28, 2006

(65) Prior Publication Data

US 2008/0162000 A1   Jul. 3, 2008

(51) Int. Cl.
G05D 1/00 (2006.01)
(52) U.S. Cl. ............... 701/42; 318/561; 180/446
(58) Field of Classification Search ......... 701/41–42; 318/561; 180/6.2, 6.24, 6.62, 446
See application file for complete search history.

(56) References Cited

U.S. PATENT DOCUMENTS

| | | | |
|---|---|---|---|
| 3,022,850 A | | 2/1962 | Bidwell et al. |
| 4,666,013 A | * | 5/1987 | Shibahata et al. ........... 180/421 |
| 4,706,771 A | * | 11/1987 | Kawabe et al. .............. 180/415 |
| 4,706,979 A | * | 11/1987 | Kawabe et al. .............. 180/414 |
| 4,773,012 A | * | 9/1988 | Ito et al. ..................... 701/42 |
| 4,800,721 A | | 1/1989 | Cemenska et al. |

(Continued)

FOREIGN PATENT DOCUMENTS

| | | | |
|---|---|---|---|
| EP | 1 227 027 | | 7/2002 |
| JP | 01202577 A | * | 8/1989 |
| JP | 02114063 A | * | 4/1990 |
| JP | 06211152 A | * | 8/1994 |
| JP | 07205829 A | * | 8/1995 |
| JP | 11091609 A | * | 4/1999 |

OTHER PUBLICATIONS

Input-Output Decoupling Control by Measurement Feedback in Four-Wheel-Active-Steering Vehicles; Marino, R. et al; Decision and Control, 2006 45th IEEE Conference on; Digital Object Identifier: 10.1109/CDC.2006.377274; Publication Year: 2006, pp. 1715-1720.*

(Continued)

*Primary Examiner*—Cuong H Nguyen
(74) *Attorney, Agent, or Firm*—Finnegan, Henderson, Farabow, Garrett & Dunner LLP

(57) ABSTRACT

A motion-control system includes an operator interface with an operator-input member and a controllable force feedback device drivingly connected to the operator-input member. The motion-control system may also include controls that regulate the motion of one or more moveable components, including adjusting a first operating parameter in a manner that depends at least in part on a control error between a target value of a second operating parameter and an actual value of the second operating parameter. The target value of the second operating parameter may be based at least in part on the motion of the operator-input member. The controls may also operate the controllable force feedback device to provide feedback force on the operator-input member in a manner that depends at least in part on the control error and such that the derivative of the feedback force with respect to the control error varies dependent at least in part on the control error.

19 Claims, 5 Drawing Sheets

U.S. PATENT DOCUMENTS

| | | | |
|---|---|---|---|
| 4,878,557 A * | 11/1989 | Shibahata et al. | 180/415 |
| 4,949,265 A * | 8/1990 | Eguchi et al. | 701/42 |
| 4,951,207 A * | 8/1990 | Furukawa et al. | 701/42 |
| 5,018,070 A * | 5/1991 | Eguchi | 701/42 |
| 5,150,764 A * | 9/1992 | Eguchi et al. | 180/415 |
| 5,268,841 A * | 12/1993 | Mouri | 701/42 |
| 5,274,555 A * | 12/1993 | Fukunaga et al. | 701/42 |
| 5,317,513 A * | 5/1994 | Mouri | 701/42 |
| 5,375,057 A * | 12/1994 | Ackermann | 701/42 |
| 5,412,571 A * | 5/1995 | Eguchi et al. | 701/42 |
| 5,448,481 A * | 9/1995 | Asanuma et al. | 701/42 |
| 5,473,235 A | 12/1995 | Lance et al. | |
| 5,576,956 A * | 11/1996 | Ashizawa et al. | 701/42 |
| 5,576,957 A * | 11/1996 | Asanuma et al. | 701/42 |
| 5,734,570 A * | 3/1998 | Arlandis | 701/42 |
| 5,745,862 A * | 4/1998 | Hirano | 701/1 |
| 5,908,457 A | 6/1999 | Higashira et al. | |
| 5,923,096 A | 7/1999 | Manak | |
| 5,964,814 A * | 10/1999 | Muller et al. | 701/41 |
| 6,104,382 A | 8/2000 | Martin et al. | |
| 6,179,082 B1 | 1/2001 | Ikari | |
| 6,363,305 B1 | 3/2002 | Kaufmann et al. | |
| 6,370,460 B1 | 4/2002 | Kaufmann et al. | |
| 6,373,465 B2 | 4/2002 | Jolly et al. | |
| 6,474,436 B1 | 11/2002 | Konigorski | |
| 6,505,703 B2 | 1/2003 | Stout et al. | |
| 6,535,806 B2 * | 3/2003 | Millsap et al. | 701/42 |
| 6,540,044 B1 | 4/2003 | Bohringer et al. | |
| 6,550,565 B2 | 4/2003 | Thomas et al. | |
| 6,564,897 B2 | 5/2003 | Dammeyer | |
| 6,609,052 B2 | 8/2003 | Radamis et al. | |
| 6,637,311 B2 | 10/2003 | Barden | |
| 6,687,588 B2 | 2/2004 | Demerly et al. | |
| 6,688,420 B2 | 2/2004 | Zheng et al. | |
| 6,738,699 B2 | 5/2004 | Yao et al. | |
| 6,804,594 B1 * | 10/2004 | Chen et al. | 701/42 |
| 6,836,982 B1 | 1/2005 | Augustine | |
| 6,840,346 B2 | 1/2005 | Sugitani et al. | |
| 6,917,867 B2 | 7/2005 | Huang et al. | |
| 6,918,460 B2 | 7/2005 | Tajima et al. | |
| 6,937,929 B2 | 8/2005 | Hayasaka | |
| 6,938,725 B2 | 9/2005 | Fujioka et al. | |
| 6,942,057 B2 | 9/2005 | Boloorchi et al. | |
| 7,058,493 B2 * | 6/2006 | Inagaki | 701/41 |
| 7,099,760 B2 * | 8/2006 | Lin et al. | 701/41 |
| 7,130,729 B2 * | 10/2006 | Shin et al. | 701/42 |
| 7,546,191 B2 * | 6/2009 | Lin et al. | 701/42 |
| 7,599,774 B2 * | 10/2009 | Shin et al. | 701/42 |
| 2001/0032749 A1 | 10/2001 | Thomas et al. | |
| 2002/0079155 A1 | 6/2002 | Andonian et al. | |
| 2002/0129988 A1 | 9/2002 | Stout et al. | |
| 2002/0143451 A1* | 10/2002 | Hac et al. | 701/48 |
| 2003/0060955 A1 | 3/2003 | Suissa | |
| 2003/0090460 A1 | 5/2003 | Schena et al. | |
| 2004/0093139 A1 | 5/2004 | Wildey et al. | |
| 2004/0193345 A1* | 9/2004 | Chen et al. | 701/42 |
| 2004/0200661 A1 | 10/2004 | Sugitani et al. | |
| 2005/0043874 A1* | 2/2005 | Chen et al. | 701/42 |
| 2006/0020382 A1* | 1/2006 | Shin et al. | 701/42 |
| 2007/0213902 A1* | 9/2007 | Shin et al. | 701/42 |
| 2008/0162000 A1* | 7/2008 | Dattilo et al. | 701/42 |

OTHER PUBLICATIONS

Robust control of low-cost actuator for automotive active front steering application; Namuduri, C.S. et al., Energy Conversion Congress and Exposition, 2009. ECCE 2009. IEEE; Digital Object Identifier: 10.1109/ECCE.2009.5316063; Publication Year: 2009, pp. 2108-2114.*

Research of Automotive Steer-by-Wire Control Based on Integral Partition PID Control;Fu Xiuwei et al.; Genetic and Evolutionary Computing, 2009. WGEC '09. 3rd International Conference on; Digital Object Identifier: 10.1109/WGEC.2009.21 Publication Year: 2009, pp. 561-564.*

Fuzzy speed and steering control of an AGV; Kodagoda, K.R.S. et al.; Control Systems Technology, IEEE Transactions on vol. 10, Issue: 1; Digital Object Identifier: 10.1109/87.974344; Publication Year: 2002, pp. 112-120.*

Modification of vehicle handling characteristics via steer-by-wire; Yih, P.; Gerdes, J.C.; Control Systems Technology, IEEE Transactions on; vol. 13, Issue: 6; Digital Object Identifier: 10.1109/TCST.2005.854320; Publication Year: 2005, pp. 965-976.*

Simulating closed- and open-loop voluntary movement: a nonlinear control-systems approach; Davidson, P.R. et al.; Biomedical Engineering, IEEE Transactions on; vol. 49, Issue: 11; Digital Object Identifier: 10.1109/TBME.2002.804601; Publication Year: 2002, pp. 1242-1252.*

A nested PID steering control for lane keeping in vision based autonomous vehicles; Marino, R. et al; American Control Conference, 2009. ACC '09.; Digital Object Identifier: 10.1109/ACC.2009.5160343; Publication Year: 2009, pp. 2885-2890.*

Handling performance for active rear-wheel steering vehicle robust control; Zhong-hua Cui et al.; Automation and Logistics, 2008. ICAL 2008. IEEE International Conference on; Digital Object Identifier: 10.1109/ICAL.2008.4636144; Publication Year: 2008, pp. 191-195.*

Tracking control of the orbitally flat kinematic car with a new time-scaling input; Kiss, B.; Szadeczky-Kardoss, E.; Decision and Control, 2007 46th IEEE Conference on; Digital Object Identifier: 10.1109/CDC.2007.4434463; Publication Year: 2007, pp. 1969-1974.*

Active steering control based on piecewise affine regions; Scalzi, Stefano; Benine-Neto, Andre; Netto, Mariana; Pasillas-Lepine, William; Mammar, Said; American Control Conference (ACC), 2010; Publication Year: 2010, pp. 5362-5367.*

Optimal model following control of four-wheel active steering vehicle; Bin Li; Fan Yu; Information and Automation, 2009. ICIA '09. International Conference on; Digital Object Identifier: 10.1109/ICINFA.2009.5205043; Publication Year: 2009, pp. 881-886.*

Performance analysis of 4WS vehicle based on different control strategy; Wang Shufeng; Zhang Junyou; Control and Decision Conference, 2009. CCDC '09. Chinese; Digital Object Identifier: 10.1109/CCDC.2009.5195180; Publication Year: 2009, pp. 5401-5404.*

Adaptive Vehicle Lateral-Plane Motion Control Using Optimal Tire Friction Forces With Saturation Limits Consideration; Ahmadi, J.; Sedigh, A.K.; Kabganian, M.; Vehicular Technology, IEEE Transactions on; vol. 58, Issue: 8; Digital Object Identifier: 10.1109/TVT.2009.2023660; Publication Year: 2009, pp. 4098-4107.*

* cited by examiner

MOTION-CONTROL SYSTEM

TECHNICAL FIELD

The present disclosure relates to motion-control systems and, more particularly, to motion-control systems that include an operator interface with a moveable operator-input member.

BACKGROUND

Many machines include motion-control systems that have one or more moveable components and controls that regulate the motion of the one or more moveable components. Some such motion-control systems include an operator interface with a moveable operator-input member, such as a joystick, steering wheel, or a pedal, that an operator may use to provide input to the motion-control system. In some cases, such an operator-input member may provide inputs to one or more components of the motion-control system through a mechanical connection. Such a mechanical connection between an operator-input member and another component of the motion-control system may transmit feedback forces to the operator-input member. An operator may glean information about the operation of the motion-control system from such feedback forces.

Some motion-control systems use means other than a mechanical connection to transmit inputs from a moveable operator-input member to one or more other components of the motion-control system. For example, some motion-control systems may use electrical signals to transmit operator inputs received through an operator-input member to other components of the motion-control system. Such other means of transmitting operator inputs to other components of the motion-control system may have various advantages, but they generally do not provide feedback force to the operator manipulating the operator-input member.

U.S. Pat. No. 6,535,806 B2 to Millsap et al. ("the '806 patent") discloses a steer-by-wire type steering system with a steering wheel tactile feedback device that provides feedback force on the steering wheel of the steering system. The steering system of the '806 patent includes a controller that supplies the steering wheel tactile feedback device with a command signal that controls the magnitude of the feedback force that the steering wheel tactile feedback device applies to the steering wheel. The controller generates the command signal based on the speed of the vehicle, the actual steering direction of the vehicle, the angle of the steering wheel, and a control error determined by comparing an actual steering direction of the vehicle and the angle of the steering wheel. With reference to a block diagram in FIG. 2, the '806 patent describes one general signal-processing method that the controller may use to generate the command signal for the steering wheel tactile feedback device based on these factors.

Although the '806 patent discloses a steer-by-wire system with a steering wheel tactile feedback device that provides feedback force on the steering wheel of the steering system, certain disadvantages persist. For example, by using only speed and error as factors in controlling the magnitude of the feedback force, the steering system of the '806 patent may provide an operator only very basic information. As a result, the operator may not get all the information that the operator desires from the feedback force on the steering wheel. Additionally, the '806 patent does not disclose how the feedback force on the steering wheel actually varies as a function of the various factors that the controller uses to generate the command signal. If the controller does not maintain a desirable relationship between these factors and the feedback force on the steering wheel, it may compromise the operating experience for the operator of the vehicle.

The motion-control system and methods of the present disclosure solve one or more of the problems set forth above.

SUMMARY OF THE INVENTION

One disclosed embodiment relates to a motion-control system that includes an operator interface with an operator-input member and a controllable force feedback device drivingly connected to the operator-input member. The motion-control system may also include controls that regulate the motion of one or more moveable components, including adjusting a first operating parameter in a manner that depends at least in part on a control error between a target value of a second operating parameter and an actual value of the second operating parameter. The target value of the second operating parameter may be based at least in part on the motion of the operator-input member. The controls may also operate the controllable force feedback device to provide feedback force on the operator-input member in a manner that depends at least in part on the control error and such that the derivative of the feedback force with respect to the control error varies dependent at least in part on the control error.

Another embodiment relates to a method of operating a motion-control system. The method may include adjusting the value of a first operating parameter of the motion-control system based at least in part on a control error between a target value of a second operating parameter and an actual value of the second operating parameter. The method may also include determining the target value of the second operating parameter of the motion-control system based at least in part on the motion of an operator-input member of an operator interface of the motion-control system. Additionally, the method may include operating a controllable force feedback device drivingly connected to the operator-input member to provide feedback force on the operator-input member in a manner that depends at least in part on the control error and such that the derivative of the feedback force with respect to the control error varies as a function of the control error.

A further embodiment relates to a steering system that includes an operator interface with an operator-input member and a controllable force feedback device drivingly connected to the operator-input member. The steering system may also include controls that operate the controllable force feedback device to provide feedback force on the operator-input member based at least in part on a control error between a target value of an operating parameter of the steering system and an actual value of the operating parameter. The controls may regulate the feedback force in a manner such that the derivative of the feedback force with respect to the control error decreases at a first positive control error value. The controls may also regulate the feedback force in a manner such that the derivative of the feedback force with respect to the control error increases at a second positive control error value, the second positive control error value being higher than the first.

DETAILED DESCRIPTION

Figure 1:
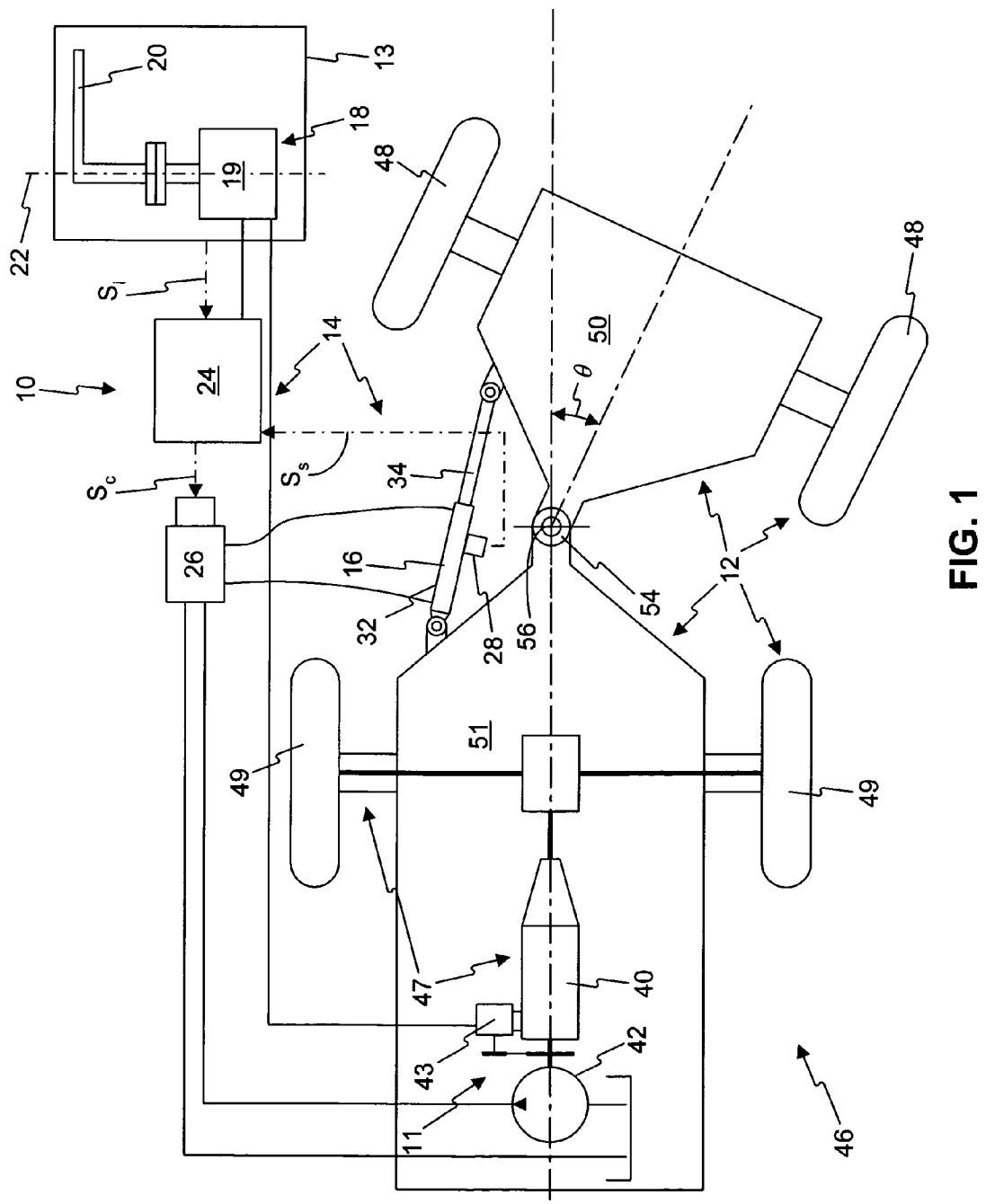
FIG. 1 is a schematic illustration of one embodiment of a motion-control system according to the present disclosure implemented as a steering system of a mobile machine.

FIG. 1 illustrates a motion-control system 10 according to the present disclosure. Motion-control system 10 may include moveable components 12, a power source 11, an operator interface 13, and controls 14 for controlling the motion of moveable components 12.

Dependent in part on the purpose that motion-control system 10 serves, moveable components 12 may include various numbers and types of components. In some embodiments, such as the example provided in FIG. 1, motion-control system 10 may be a steering system for a mobile machine 46 with a propulsion system 47. Accordingly, moveable components 12 may include steering devices 48, 49 that transmit steering forces to the environment surrounding mobile machine 46 to steer mobile machine 46. As FIG. 1 shows, in some embodiments, steering devices 48, 49 may be wheels. Moveable components 12 may also include components that connect to steering devices 48, 49 and allow adjustment of a steering angle θ between steering devices 48 and steering devices 49. For example, in embodiments such as the one shown in FIG. 1, motion-control system 10 may form an articulated steering system, in which case, moveable components 12 may include a moveable frame section 50 that steering devices 48 mount to and a moveable frame section 51 that steering devices 49 mount to. A pivot joint 54 between frame sections 50, 51 may allow adjustment of steering angle θ by allowing frame sections 50, 51 to pivot relative to one another about an axis 56. In embodiments where motion-control system 10 forms an articulated steering system, the angle between steering devices 48 and steering devices 49 equals the angle between frame sections 50, 51. Accordingly, in such embodiments, the angle between frame sections 50, 51 may constitute steering angle θ.

Of course, in some embodiments, motion-control system 10 may form a type of steering system other than an articulated steering system. For example, motion-control system 10 may form an Ackerman-type steering system. An Ackerman-type steering system may, for example, have steering devices 48 connected to the frame of mobile machine 46 in a manner that allows pivoting steering devices 48 relative to the frame of mobile machine 46 to change the angle of steering devices 48 with respect to the longitudinal axis of mobile machine 46. Accordingly, in embodiments where motion-control system 10 forms an Ackerman-type steering system, steering angle θ may constitute the angle between the general direction steering devices 48 point and the general direction steering devices 49 point. Of course, one steering device 48 may point in a slightly different direction than the other steering device 48 and/or one steering device 49 may point in a slightly different direction than the other steering device 49. In the case where one steering device 48 points in a slightly different direction than the other steering device 48, the direction that one steering device 48 points in may define steering angle θ, or the average of the directions that steering devices 48 point in may define steering angle θ. Similarly, in the case where one steering device 49 points in a slightly different direction than the other steering device 49, the direction that one steering device 49 points in may define steering angle θ, or the average of the directions that steering devices 49 point in may define steering angle θ.

Power source 11 may include any component or components that provide power for motion-control system 10. Power source 11 may provide power in various ways, such as, for example, mechanically, by supplying pressurized hydraulic fluid, by supplying pressurized air, and/or by supplying electricity. As FIG. 1 shows, in some embodiments, power source 11 may include an engine 40 of propulsion system 47, a hydraulic pump 42 drivingly connected to engine 40, and an electric generator 43 drivingly connected to engine 40.

Operator interface 13 may include a moveable operator-input member 20. As FIG. 1 shows, in some embodiments, operator-input member 20 may be a handle, such as a joystick. The configuration of operator interface 13 may allow operator-input member 20 to move in various manners. In some embodiments, operator-input member 20 may pivot about an axis 22. Additionally, in some embodiments, operator-input member 20 may have a limited range of motion. For example, in some embodiments, operator-input member 20 may be able to pivot through less than 180 degrees about axis 22.

Operator interface 13 may generate an input signal $S_i$ based at least in part on the motion of operator-input member 20. In some embodiments, operator interface 13 may generate input signal $S_i$ in a manner such that the value of input signal $S_i$ corresponds to the position of operator-input member 20. Operator interface 13 may transmit input signal $S_i$ in various ways, including, but not limited to, electrically, optically, magnetically, wirelessly, and/or with fluid pressure. Input signal $S_i$ may serve various purposes. In some embodiments, input signal $S_i$ may indicate a target value for one or more parameters of the motion of moveable components 12 and/or components of controls 14 connected to moveable components 12. For example, input signal $S_i$ may indicate a target value for steering angle θ.

As FIG. 1 shows, operator interface 13 may also include a controllable force feedback device 18 drivingly connected to operator-input member 20. Controllable force feedback device 18 may include one or more components that allow applying a feedback force to operator-input member 20 and adjusting the magnitude of the feedback force independently of the position of operator-input member 20. As used herein, the term "feedback force" refers to linear force and/or torque applied to operator-input member 20 by controllable force feedback device 18. Controllable force feedback device 18 may include, for example, a powered actuator 19, such as an electric motor, drivingly connected to operator-input member 20. Controllable force feedback device 18 may receive power from power source 11 in various forms. For example, in embodiments where controllable force feedback device 18 includes an electric motor, electric generator 43 may supply electricity to operate controllable force feedback device 18.

Controls 14 may include any component or components operable to control one or more aspects of the operation of motion-control system 10 dependent at least partially on inputs received through operator interface 13. In some embodiments, controls 14 may include an actuator 16 for controlling one or more aspects of the motion of moveable components 12. Actuator 16 may be a linear actuator, a rotary actuator, or a type of actuator that generates motion other than purely rotational or linear motion. Additionally, actuator 16 may be, for example, a hydraulic actuator, a pneumatic actuator, or an electrical actuator. As FIG. 1 shows, in some embodiments, actuator 16 may be a hydraulic cylinder with a housing 32 and a drive member 34.

Actuator 16 may be drivingly connected to moveable components 12. For example, as FIG. 1 shows, actuator 16 may be directly drivingly connected to each frame section 50, 51 and, through each frame section 50, 51, indirectly drivingly connected to steering devices 48, 49. This may allow actuator 16 to drive frame sections 50, 51 and steering devices 48, 49. As FIG. 1 shows, in some embodiments, actuator 16 may connect to frame sections 50, 51 in a manner that enables actuator 16 to adjust steering angle θ by pivoting frame section 50 and steering devices 48 about axis 56 relative to frame section 51 and steering devices 49.

Controls 14 may also include provisions for gathering information about the motion of actuator 16 and/or the motion of moveable components 12, such as one or more sensors. For example, controls 14 may include a sensor 28 that provides a sensor signal $S_s$ relating to the actual value of one or more parameters of the motion of actuator 16 and moveable components 12. For example, sensor signal $S_s$ from sensor 28 may indicate the position of drive member 34 of actuator 16. In the embodiment shown in FIG. 1, by indicating the position of drive member 34 of actuator 16, sensor signal $S_s$ may also indicate steering angle θ and the current turning radius of mobile machine 46. Sensor 28 may transmit signal $S_s$ in various ways, including, but not limited to, electrically, optically, mechanically, magnetically, wirelessly, and/or with fluid pressure.

Additionally, controls 14 may include provisions for controlling controllable force feedback device 18. For example, controls 14 may include a controller 24 operatively connected to controllable force feedback device 18. Controller 24 may include one or more processors (not shown) and one or more memory devices (not shown). Controller 24 may use various control algorithms to operate controllable force feedback device 18. The present disclosure provides details of some exemplary control algorithms that controller 24 may use below.

Controls 14 may also include provisions for controlling actuator 16, such as provisions for generating a control signal $S_c$ for controlling one or more aspects of the operation of actuator 16. Control signal $S_c$ may transmit information in various ways, including, but not limited to, electrically, optically, mechanically, magnetically, wirelessly, and/or with fluid pressure. In some embodiments, controller 24 may generate control signal $S_c$. In some embodiments, controller 24 may generate control signal $S_c$ based at least in part on inputs from other components, such as input signal $S_i$ from operator interface 13 and sensor signal $S_s$ from sensor 28. Controller 24 may employ various algorithms for generating control signal $S_c$ to advance various objectives. The present disclosure provides details of some exemplary control algorithms that controller 24 may use to generate control signal $S_c$ below.

Control signal $S_c$ may control various aspects of the operation of actuator 16 through various means. For example, control signal $S_c$ may control the position, velocity, acceleration, and/or force output of actuator 16 by controlling a control component 26 that controls the supply of power from power source 11 to actuator 16. In some embodiments, control component 26 may include a valve that meters fluid flow between hydraulic pump 42 and actuator 16. Additionally, in some such embodiments, control component 26 may include an electric control solenoid for controlling one or more aspects of the operation of the valve. In such embodiments, control signal $S_c$ may, for example, consist of electric current that flows through the electric control solenoid, thereby controlling the position, velocity, acceleration and/or force output of actuator 16 by controlling the operating state of the valve and, thus, the flow of hydraulic fluid to and/or from actuator 16. Of course, in addition to control signal $S_c$, other factors may affect the position, velocity, acceleration and force output of actuator 16. Such other factors may include, for example, the pressure at which hydraulic pump 42 supplies fluid and the load on actuator 16.

Motion-control system 10 is not limited to the examples discussed above. For example, in addition to, or in place of, powered actuator 19, controllable force feedback device 18 may include other types of components operable to apply controllable feedback force to operator-input member 20, such as one or more controllable brakes or controllable dampers. Additionally, operator-input member 20 may be a different kind of handle than a joystick, such as a steering wheel, or a component other than a handle, such as a pedal. Similarly, rather than pivoting around axis 22, operator-input member 20 may move in a different manner, such as linearly.

Furthermore, control signal $S_c$ may control actuator 16 through means other than control component 26. In some embodiments, control signal $S_c$ may directly control one or more components of actuator 16 to control one or more aspects of the operation of actuator 16. Alternatively, in some embodiments, control signal $S_c$ may control one or more aspects of the operation of actuator 16 by controlling one or more aspects of the operation of power source 11. Furthermore, in some embodiments, controls 14 may use more than one control signal to control actuator 16.

Motion-control system 10 may also include components not shown in FIG. 1 and/or omit one or more of the components shown in FIG. 1. For example, motion-control system 10 may have a different number of moveable components 12 than FIG. 1 shows. In some embodiments, motion-control system 10 may include a single moveable component 12 drivingly connected to actuator 16. Additionally, motion-control system 10 may have provisions other than controller 24 for operating controllable force feedback device 18 and generating control signal $S_c$, such as, for example, hardwired control circuits, hydraulic controls, pneumatic controls, mechanical controls, and/or some combination thereof. Motion-control system 10 may also have one or more additional actuators. In some embodiments, motion-control system 10 may include an additional actuator connected between frame sections 50, 51 like actuator 16 but on the opposite side of pivot joint 54. In such embodiments, controls 14 may, for example, control this additional actuator with a control signal equal and opposite control signal $S_c$ to operate the additional actuator in a manner equal and opposite actuator 16 so as to assist actuator 16 in adjusting steering angle θ.

Motion-control system 10 may also have different configurations of moveable components 12 for steering mobile machine 46. For example, motion-control system 10 may omit one or more of steering devices 48, 49 and/or include more steering devices than shown in FIG. 1. Additionally, rather than wheels, steering devices 48, 49 may be track units, skis, or other types of devices configured to apply steering forces to the ground to steer mobile machine 46. Furthermore, motion-control system 10 may be a different type of steering system than an articulated steering system or an Ackerman-type steering system, such as a skid-steer type steering system. Additionally, in some embodiments, mobile machine 46 may be a watercraft or an aircraft, and steering devices 48, 49 may be devices configured to apply steering forces to fluid surrounding mobile machine 46, such as rudders.

Motion-control system 10 may also be a type of system other than a steering system of a mobile machine, such as, for example, a propulsion system, an excavating implement, or a hoist. In some embodiments, motion-control system 10 may have a stationary base.

INDUSTRIAL APPLICABILITY

Motion-control system 10 may have application for any task that requires controlling one or more aspects of the motion of one or more moveable components 12. Controls 14 of motion-control system 10 may control the motion of moveable components 12 in various manners to advance various objectives.

In some embodiments, controls 14 may adjust the value of a first operating parameter of motion-control system 10 with control signal $S_c$ for the purpose of achieving a target value of a second operating parameter of motion-control system 10. For example, controls 14 may adjust the velocity of actuator 16 by adjusting control signal $S_c$ for the purpose of achieving a target value of a parameter related to the position of moveable components 12. Controls 14 may, for example, adjust the velocity of actuator 16 by adjusting control signals $S_c$ for the purpose of achieving a target value $TAR_v$ of steering angle $\theta$.

Of course, the target value $TAR_v$ of steering angle $\theta$ may equate to a target value of one or more corresponding operating parameters, and adjusting the velocity of actuator 16 by adjusting the value of control signal $S_c$ may equate to adjusting one or more corresponding operating parameters. For example, in the embodiment shown in FIG. 1, any particular value of steering angle $\theta$ corresponds to a particular turning radius of mobile machine 46, and the target value of steering angle $\theta$ may also constitute a target value of the turning radius of mobile machine 46. Similarly, because any particular value of steering angle $\theta$ corresponds to particular positions of moveable components 12 with respect to one another and also a particular position of drive member 34 of actuator 16, the target value $TAR_v$ of steering angle $\theta$ may also constitute a target value of the position of each of these components. Additionally, in the embodiment shown in FIG. 1, adjusting the velocity of actuator 16 also constitutes adjusting the rate of change of steering angle $\theta$ and the rate of change of the turning radius of mobile machine 46.

Figure 2:
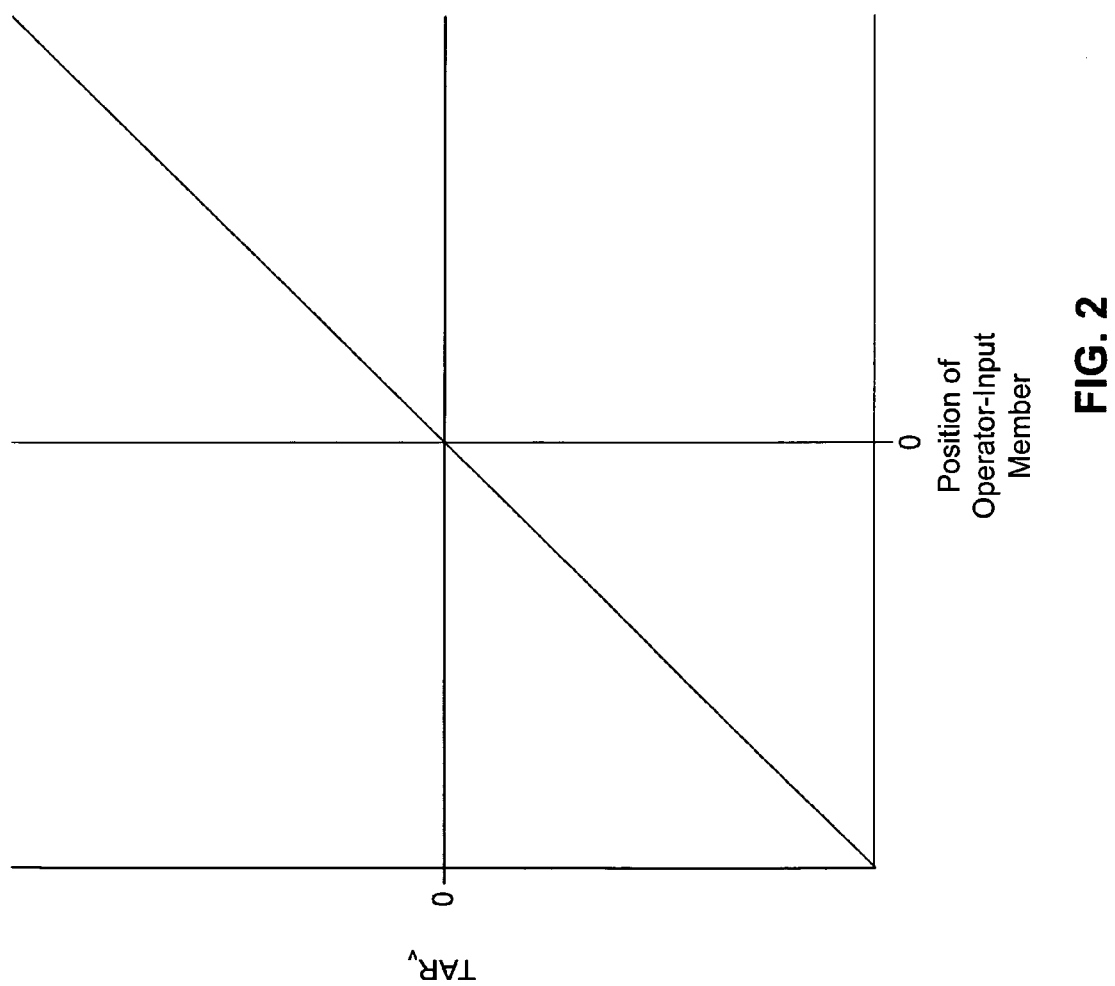
FIG. 2 graphically illustrates one relationship that may exist between two operating parameters of a motion-control system according to the present disclosure.

Controls 14 may base the target value $TAR_v$ of steering angle $\theta$ on various factors. In some embodiments, controls 14 may use input signal $S_i$ to indicate the target value $TAR_v$ of steering angle $\theta$. Additionally, as mentioned above, operator interface 13 may generate input signal $S_i$ in a manner such that input signal $S_i$ corresponds to the position of operator-input member 20. Accordingly, the target value $TAR_v$ of steering angle $\theta$ may vary as a function of the position of operator-input member 20. FIG. 2 provides one example of how the target value $TAR_v$ of steering angle $\theta$ may vary as a function of the position of operator-input member 20. On the horizontal axis of FIG. 2, zero corresponds to a default position of operator-input member 20. Increasingly positive values along the horizontal axis of FIG. 2 correspond to positions of operator-input member 20 increasingly distant from its default position in one direction, and increasingly negative values correspond to positions of operator-input member 20 increasingly distant from its default position in an opposite direction.

Figure 3:
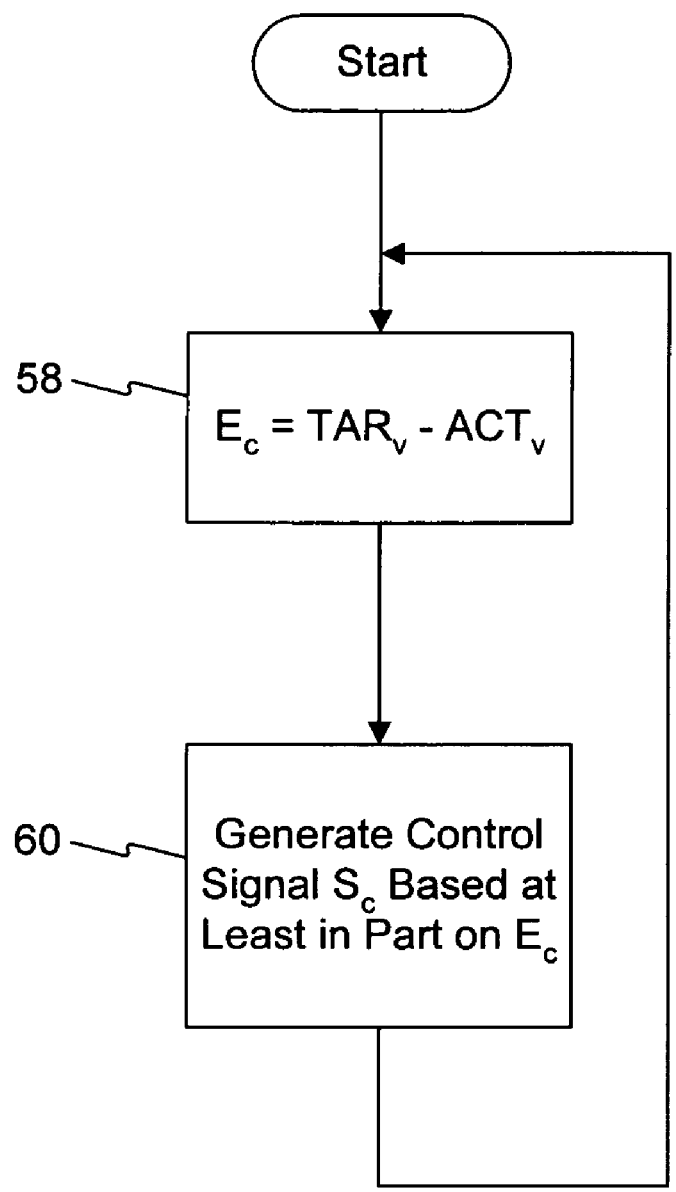
FIG. 3 is a flow chart illustrating one method of operating a motion-control system according to the present disclosure.

Controls 14 may use various closed-loop control algorithms for adjusting the velocity of actuator 16 by adjusting control signal $S_c$ with the purpose of achieving the target value $TAR_v$ of steering angle $\theta$. For example, controls 14 may employ the control algorithm illustrated in FIG. 3. According to this control method, controls 14 may first determine a control error $E_c$ by subtracting an actual value $ACT_v$ of steering angle $\theta$ from the target value $TAR_v$ of steering angle $\theta$ (step 58). Controls 14 may determine the actual value $ACT_v$ of steering angle $\theta$ in various ways. In some embodiments, controls 14 may use sensor signal $S_s$ as an indication of steering angle $\theta$.

After determining control error $E_c$, controls 14 may generate control signal $S_c$ based on control error $E_c$ (step 60) to control the velocity of actuator 16. Controls 14 may execute this process repeatedly. Using this method, controls 14 may adjust control signal $S_c$ and the velocity of actuator 16 in various manners dependent on control error $E_c$. In some embodiments, any time control error $E_c$ increases, controls 14 may adjust control signal $S_c$ in a manner to increase the velocity of actuator 16 to drive steering angle $\theta$ toward the target value $TAR_v$ more rapidly. Of course, at some point, controls 14 may reach their maximum capacity to increase the velocity of actuator 16, after which controls 14 cannot increase the velocity of actuator 16 in response to further increases in control error $E_c$. Various factors may affect the maximum capacity of controls 14 to increase the velocity of actuator 16. For example, in embodiments where actuator 16 receives power in the form of hydraulic fluid from hydraulic pump 42, the maximum possible flow rate of hydraulic fluid from hydraulic pump 42 to actuator 16 may define the maximum capacity to increase the velocity of actuator 16.

While adjusting the velocity of actuator 16 by adjusting control signal $S_c$ based on control error $E_c$ with the purpose of achieving the target value $TAR_v$ of steering angle $\theta$, controls 14 may operate controllable force feedback device 18 to provide feedback force on operator-input member 20. For example, in the case of the embodiment shown in FIG. 1, controller 24 may operate powered actuator 19 to apply torque to operator-input member 20. Controls 14 may operate controllable force feedback device 18 according to various control algorithms.

In some embodiments, controls 14 may operate controllable force feedback device 18 to provide feedback force on operator-input member 20 whenever control error $E_c$ has a nonzero value. For example, whenever control error $E_c$ has a nonzero value, controls 14 may operate controllable force feedback device 18 to urge operator-input member 20 toward a position where the target value $TAR_v$ of steering angle $\theta$ indicated by input signal $S_i$ would correspond to the actual value of steering angle $\theta$. By doing so, controls 14 may present resistance to an operator when the operator moves operator-input member 20 in a direction that increases the difference between the target value $TAR_v$ of steering angle $\theta$ and the actual value of steering angle $\theta$. This resistance may implicitly indicate to the operator when controls 14 are working to achieve the target value $TAR_v$ of steering angle $\theta$ commanded by the operator with operator-input member 20. Additionally, if the operator releases operator-input member 20 when control error $E_c$ has a nonzero value, the feedback force supplied by controllable force feedback device 18 may drive operator-input member 20 to a position where the target value $TAR_v$ of steering angle $\theta$ corresponds to the actual value $ACT_v$.

Figure 4A:
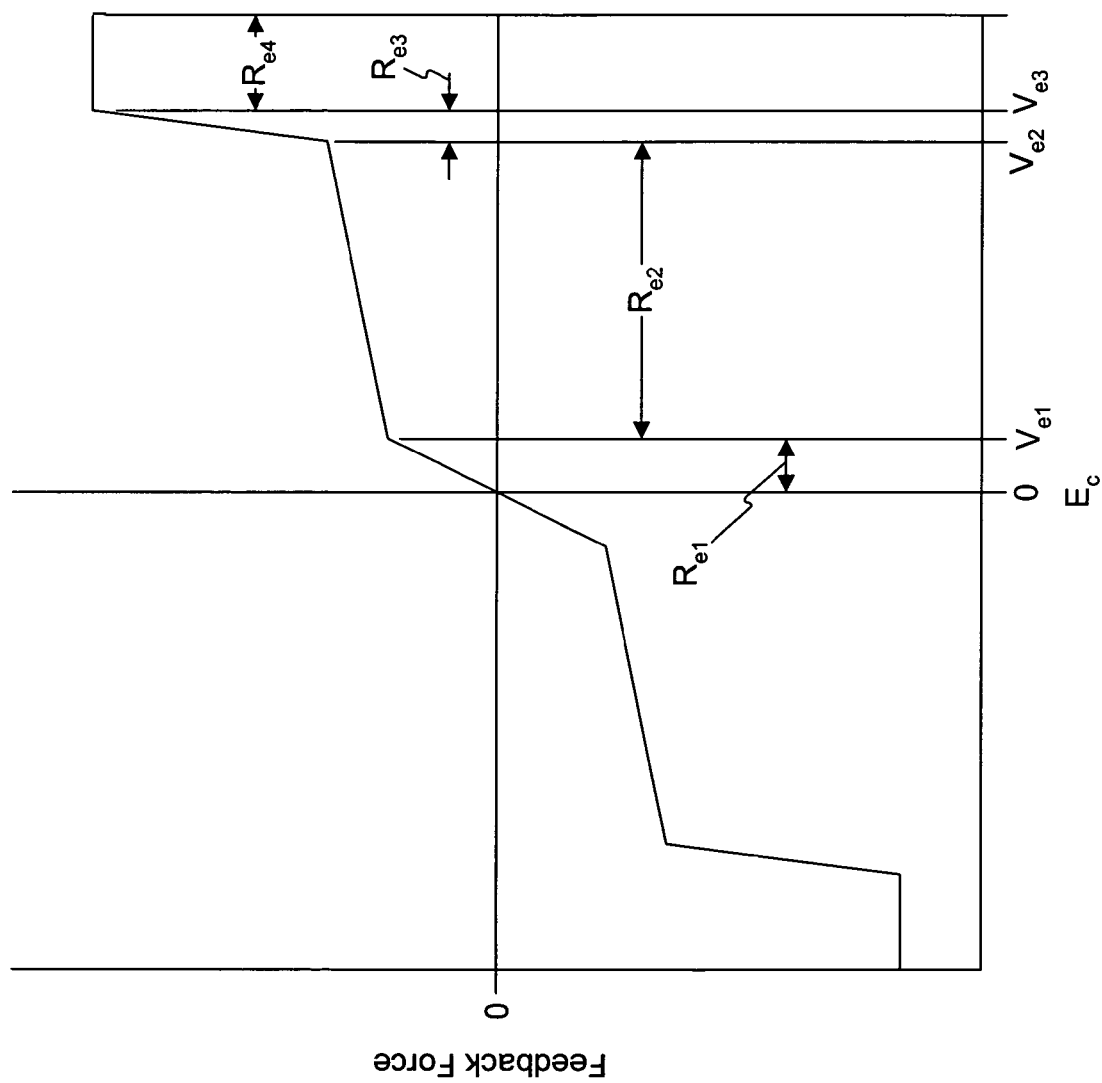
FIG. 4A graphically illustrates one relationship that a motion-control system according to the present disclosure may maintain between a control error and a feedback force.
Figure 4B:
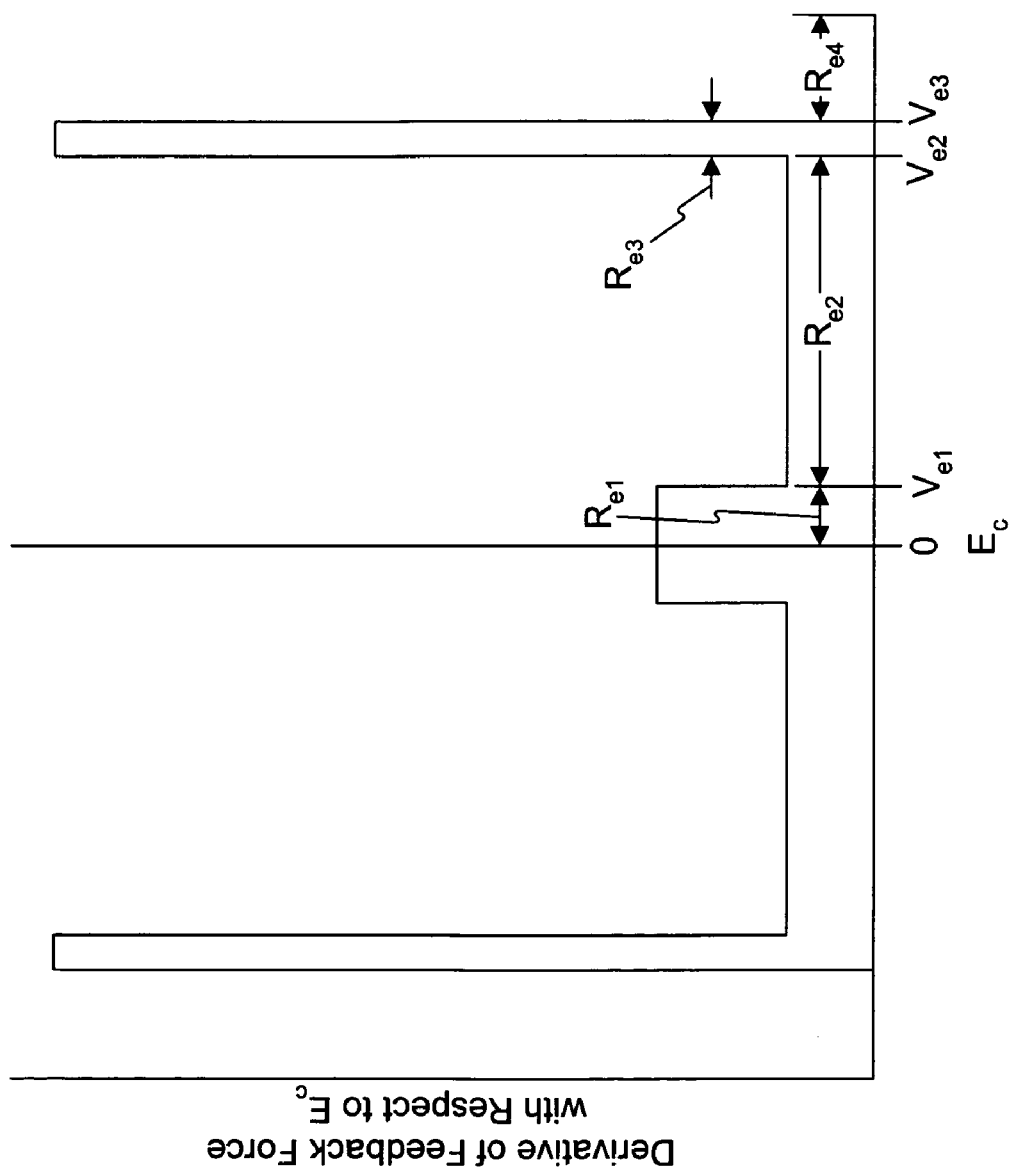
FIG. 4B illustrates the derivative of the feedback force shown in FIG. 4A with respect to control error.

Controls 14 may control the magnitude of the feedback force on operator-input member 20 in various manners based on various factors. In some embodiments, controls 14 may control the magnitude of the feedback force based at least in part on control error $E_c$. FIG. 4A provides an example of how controls 14 might adjust the magnitude of the feedback force on operator-input member 20 as a function of control error $E_c$. In FIG. 4A, control error $E_c$ varies along the horizontal axis and the feedback force varies along the vertical axis. In FIG. 4A, positive values of feedback force indicate force in one direction, and negative values of feedback force indicate feedback force in an opposite direction. FIG. 4B illustrates the derivative of the feedback force shown in FIG. 4A with respect to control error $E_c$. In FIG. 4B, control error $E_c$ varies along the horizontal axis, and the derivative of the feedback force with respect to control error $E_c$ varies along the vertical axis.

Over a first range $R_{e1}$ extending from a control error value of zero to a first positive control error value $V_{e1}$, controls 14 may maintain the derivative of the feedback force with respect to control error $E_c$ relatively high. By ramping up the feedback force relatively quickly when control error $E_c$ initially deviates from zero, controls 14 may ensure that the operator receives perceptible feedback at small values of control error $E_c$. This may also help overcome friction that resists movement of operator-input member 20.

At first positive control error value $V_{e1}$, controls 14 may decrease the derivative of the feedback force with respect to control error $E_c$. As FIG. 4B shows, in some embodiments, controls 14 may decrease the derivative of the feedback force with respect to control error $E_c$ in a stepped manner.

Additionally, controls 14 may operate controllable force feedback device 18 in a manner such that the average value of the derivative of the feedback force with respect to control error $E_c$ is lower over a second range extending from the first positive control error value $V_{e1}$ to a second positive control error value $V_{e2}$ than the average value of the derivative of the feedback force with respect to control error $E_c$ over first range $R_{e1}$. Furthermore, in some embodiments, controls 14 may maintain the derivative of the feedback force with respect to control error $E_c$ lower over all of second range $R_{e2}$ than over range $R_{e1}$. By increasing the feedback force relatively gradually at moderate values of control error $E_c$, controls 14 may indicate to the operator the increasing effort exerted to achieve the target angle $TAR_v$ of steering angle $\theta$ without requiring undue force to move operator-input member 20.

At second positive control error value $V_{e2}$, controls 14 may increase the derivative of the feedback force with respect to control error $E_c$. As FIG. 4B shows, in some embodiments, controls 14 may increase the derivative of the feedback force with respect to control error $E_c$ in a stepped manner.

Additionally, controls 14 may operate controllable force feedback device 18 in a manner such that the average value of the derivative of the feedback force with respect to control error $E_c$ is higher over a third range $R_{e3}$ of control error values extending from second positive control error value $V_{e2}$ to a third positive control error value $V_{e3}$ than the average value of the derivative of the feedback force with respect to control error $E_c$ over second range Re2. In some embodiments, controls 14 may maintain the derivative of the feedback force with respect to control error $E_c$ higher over all of range $R_{e3}$ than over range $R_{e2}$. By ramping up the feedback force relatively rapidly at high control error values, controls 14 may indicate to an operator that controls 14 are using a relatively high percentage of the available capacity to adjust steering angle $\theta$ toward the target value $TAR_v$ commanded by the operator and further movement of operator-input member 20 may not make steering angle $\theta$ change any faster. This also tends to prevent the operator from inadvertently moving operator-input member 20 to a position that indicates a greater target value $TAR_v$ of steering angle $\theta$ than the operator actually desires.

Additionally, in some embodiments, third positive control error value $V_{e2}$ may substantially coincide with controls 14 reaching the maximum capacity to increase the rate of change of steering angle $\theta$ to drive steering angle toward the target value $TAR_v$. For example, third positive control error value $V_{e2}$ may substantially coincide with the operating point where controls 14 have adjusted the flow rate of hydraulic fluid from hydraulic pump 42 to actuator 16 as high as possible under the prevailing circumstances. In such embodiments, the abrupt increase in the feedback force when control error $E_c$ reaches the third positive control error value $V_{e2}$ may serve as a way for the operator to ascertain that controls 14 cannot adjust steering angle $\theta$ toward the target value $TAR_v$ any faster.

At third positive control error value $V_{e3}$, controls 14 may again decrease the derivative of the feedback force with respect to control error $E_c$. As FIG. 4B shows, in some embodiments, controls 14 may decrease the derivative of the feedback force with respect to control error $E_c$ in a stepped manner at third positive control error value $V_{e3}$.

Additionally, controls 14 may operate controllable force feedback device 18 in a manner such that the average value of the derivative of the feedback force with respect to control error $E_c$ is lower over a fourth range of control error values $R_{e4}$ extending up from third positive control error value $V_{e3}$ than the average value of the derivative of the feedback force with respect to control error over third range $R_{e3}$. In some embodiments, controls 14 may maintain the derivative of the feedback force with respect to control error $E_c$ substantially equal to zero over range $R_{e4}$. By providing an upper limit on the magnitude of the feedback force, controls 14 may ensure that an operator can always overcome the feedback force on the operator-input member 20, regardless of the magnitude of control error $E_c$.

As FIGS. 4A, 4B reflect, controls 14 may also vary the derivative of the feedback force with respect to control error $E_c$ for negative control error values. In some embodiments, except for applying the feedback force in an opposite direction, controls 14 may provide substantially the same relationship between increasingly negative control error values and the feedback force as controls 14 provide between increasingly positive control error values and the feedback force.

Control methods that controls 14 may implement are not limited to the examples discussed above. For example, controls 14 may base the target value $TAR_v$ of steering angle $\theta$ on other factors, in addition to input signal $S_i$, such as, for example, the travel speed of mobile machine 46. In such an embodiment, if these other parameters change, the target value $TAR_v$ of steering angle $\theta$ may change without the operator moving operator-input member 20. Similarly, controls 14 may control the feedback force on operator-input member 20 based on other factors, in addition to control error $E_c$, such as the speed of mobile machine 46 and/or the position of operator-input member 20.

Additionally, the relationship between control error $E_c$ and the feedback force and, thus, the relationship between control error $E_c$ and the derivative of the feedback force with respect to control error $E_c$ may differ in various ways from what FIGS. 4A, 4B show. In some embodiments, controls 14 may provide zero feedback force at control error values near zero. Alternatively, at control error values close to zero, controls 14 may provide higher feedback force than FIG. 4A shows. Additionally, controls 14 may fluctuate the derivative of the feedback force with respect to control error $E_c$ more times than FIG. 4B shows or less times than FIG. 4B shows. Furthermore, instead of changing the derivative of the feedback force with respect to the control error in the stepped manner FIG. 4B shows, controls 14 may change the derivative of the feedback force with respect to the control error gradually.

Additionally, controls 14 may omit one or more of the actions discussed above. For example, in embodiments where controllable force feedback device 18 includes a controllable brake but not a powered actuator, controls 14 could not operate controllable force feedback device 18 to move operator-input member 20 when an operator has released it.

Furthermore, controls 14 may apply the methods discussed above to adjust an operating parameter other than the velocity of actuator 16 and/or for the purpose of achieving a target value of a second operating parameter other than steering angle θ. For example, controls 14 may use the control methods discussed above to adjust parameters such as the position, acceleration, force output, or torque output of actuator 16 with the purpose of achieving a target value of another operating parameter of motion-control system 10. Similarly, controls 14 may use the control methods described above to adjust an operating parameter of motion-control system 10 for the purpose of achieving a target value of a different steering-related parameter, or a parameter unrelated to steering, such as, for example, a parameter related to the operation of an excavating implement, a hoist, or a propulsion system.

It will be apparent to those skilled in the art that various modifications and variations can be made in the motion-control system and methods without departing from the scope of the disclosure. Other embodiments of the disclosed motion-control system and methods will be apparent to those skilled in the art from consideration of the specification and practice of the motion-control system and methods disclosed herein. It is intended that the specification and examples be considered as exemplary only, with a true scope of the disclosure being indicated by the following claims and their equivalents.

What is claimed is:

1. A motion-control system, comprising:
   an operator interface, including
      an operator-input member;
      a controllable force feedback device drivingly connected to the operator-input member; and
   controls that regulate the motion of one or more moveable components, including adjusting a first operating parameter in a manner that depends at least in part on a control error between a target value of a second operating parameter and an actual value of the second operating parameter, the target value of the second operating parameter being based at least in part on the motion of the operator-input member; and
   wherein the controls also operate the controllable force feedback device to provide feedback force on the operator-input member in a manner that depends at least in part on the control error and such that the derivative of the feedback force with respect to the control error varies dependent at least in part on the control error.

2. The motion-control system of claim 1, wherein the target value of the second operating parameter corresponds to the value of an input signal generated by the operator interface, the input signal corresponding to the position of the operator-input member.

3. The motion-control system of claim 2, wherein:
   the controllable force feedback device includes a powered actuator;
   operating the controllable force feedback device in a manner to provide the feedback force on the operator-input member in a manner that depends at least in part on the control error includes operating the powered actuator to apply the feedback force to the operator-input member in a manner such that, if an operator releases the operator-input member while the control error has a nonzero value, the controllable force feedback device drives the operator-input member toward a position where the control error would be zero.

4. The motion-control system of claim 1, wherein the target value of the second operating parameter is a target value of a position of one or more moveable components.

5. The motion-control system of claim 4, wherein:
   the operator interface generates an input signal that corresponds to the position of the operator-input member; and
   the input signal indicates the target value of the second operating parameter.

6. The motion-control system of claim 1, wherein the controls operate the controllable force feedback device in a manner such that
   an average value of the derivative of the feedback force with respect to the control error over a first range of contra error values that extends up to a first positive control error value is higher than an average value of the derivative of the feedback force with respect to the control error over a second range of control error values that extends from the first positive control error value to a second positive control error value; and
   the average value of the derivative of the feedback force with respect to the control error over the second range of control error values is lower than an average value of the derivative of the feedback force with respect to the control error over a third range of control error values that extends up from the second positive control error value.

7. The motion-control system of claim 6, wherein the controls operate the controllable force feedback device in a manner such that the derivative of the feedback force with respect to the control error decreases in a stepped manner at the first positive control error value.

8. The motion-control system of claim 6, wherein the controls operate the controllable force feedback device in a manner such that the derivative of the feedback force with respect to the control error increases in a stepped manner at the second positive control error value.

9. The motion-control system of claim 1, wherein:
   adjusting the first operating parameter of the motion-control system in a manner that depends at least in part on the control error includes increasing the value of the first operating parameter with increasing control error until a maximum capacity to increase the value of the first operating parameter is reached; and
   at a control error value that substantially coincides with the controls reaching the maximum capacity to increase the value of the first operating parameter, the controls increase the derivative of the feedback force with respect to the control error.

10. The motion-control system of claim 1, wherein:
    the motion-control system is a steering system of a mobile machine; and
    the second operating parameter of the motion-control system relates to a trajectory of the mobile machine.

11. A method of operating a motion-control system, comprising:
    adjusting a value of a first operating parameter of the motion-control system based at least in part on a control error between a target value of a second operating parameter and an actual value of a second operating parameter;
    determining a target value of the second operating parameter of the motion-control system based at least in part on motion of an operator-input member of an operator interface of the motion-control system; and
    operating a controllable force feedback device drivingly connected to the operator-input member to provide feedback force on the operator-input member in a manner that depends at least in part on the control error and such that a derivative of the feedback force with respect to the control error varies as a function of the control error.

12. The method of claim 11, wherein:

adjusting the value of the first operating parameter based at least in part on the control error includes increasing the value of the first operating parameter with increasing control error until a maximum capacity to increase the value of the first operating parameter is reached; and providing the feedback force on the operator-input member in a manner that depends at least in part on the control error includes increasing a derivative of the feedback force with respect to the control error substantially coincident with reaching a maximum capacity to increase the value of the first operating parameter.

13. The method of claim 11, wherein providing the feedback force on the operator-input member in a manner that depends at least in part on the control error includes decreasing the derivative of the feedback force with respect to the control error at a first positive value of control error; and increasing the derivative of the feedback force with respect to the control error at a second positive value of control error, the second positive value of control error being higher than the first.

14. The method of claim 13, wherein adjusting the value of the first operating parameter based at least in part on the control error includes increasing the value of the first operating parameter with increasing control error in a manner such that a maximum capacity to increase the first operating parameter is reached substantially coincident with the second positive control error value.

15. The method of claim 11, wherein:

the motion-control system is a steering system of a mobile machine; and the second operating parameter relates to a trajectory of the mobile machine.

16. A steering system for a mobile machine, comprising:

an operator interface, including an operator-input member;

a controllable force-feedback device drivingly connected to the operator-input member;

controls that operate the controllable force feedback device to provide feedback force on the operator-input member based at least in part on a control error between a target value of an operating parameter of the steering system and an actual value of the operating parameter, wherein the operating parameter is a steering angle of the mobile machine, and the controls regulate the feedback force in a manner such that a derivative of the feedback force with respect to the control error decreases at a first positive control error value, and the derivative of the feedback force with respect to the control error increases at a second positive control error value, the second positive control error value being higher than the first.

17. The steering system of claim 16, wherein the controls further regulate the feedback force in a manner such that an average value of the derivative of the feedback force with respect to the control error over a first range of control error values extending up to the first positive control error value is higher than an average value of the derivative of the feedback force with respect to the control error over a second range of control error values extending from the first positive control error value to the second positive control error value; and the average value of the derivative of the feedback force with respect to the control error over the second range is lower than an average value of the derivative of the feedback force with respect to the control error over a third range of control error values extending up from the second positive control error value.

18. The steering system of claim 16, wherein the controls adjust the value of an additional operating parameter of the steering system as a function of the control error, including increasing the value of the additional operating parameter with increasing control error until a maximum capacity to increase the value of the additional operating parameter is reached substantially coincident with the second positive control error value.

19. The steering system of claim 18, wherein the additional operating parameter is the a rate of change of the turning radius of the mobile machine.

* * * * *